D. B. MORISON.
STEM REGENERATIVE ACCUMULATOR AND WATER HEATER.
APPLICATION FILED AUG. 23, 1912.
1,081,132.
Patented Dec. 9, 1913.
3 SHEETS—SHEET 1.
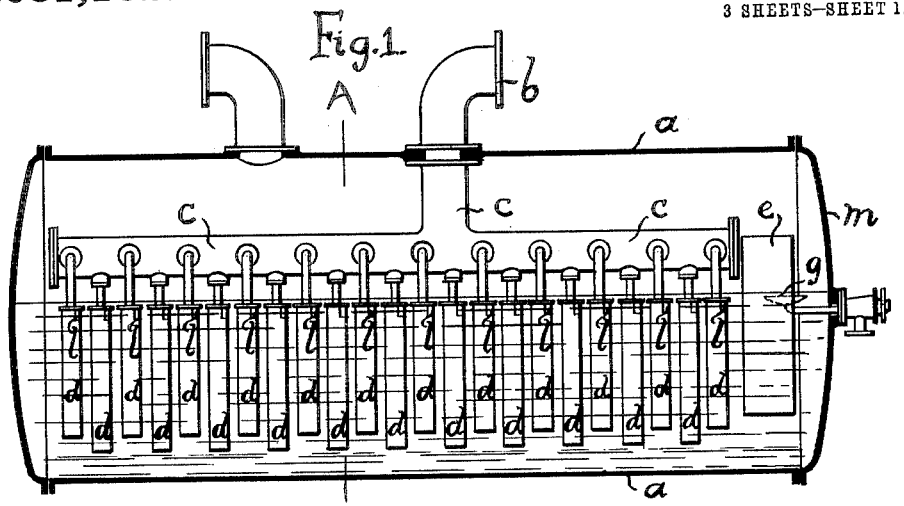
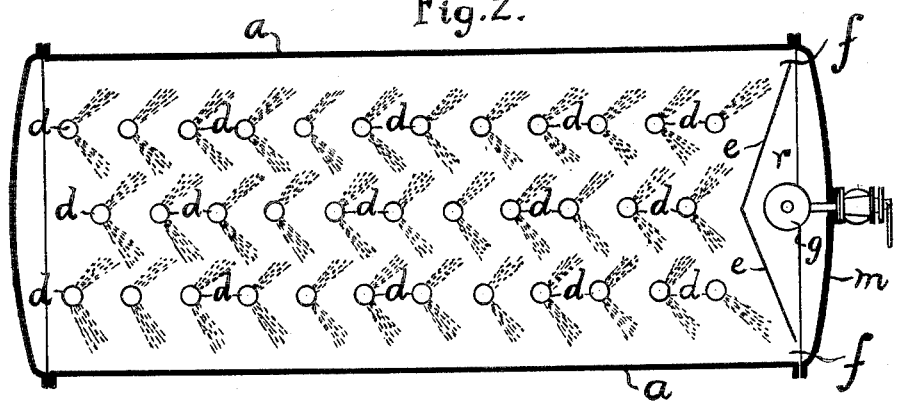
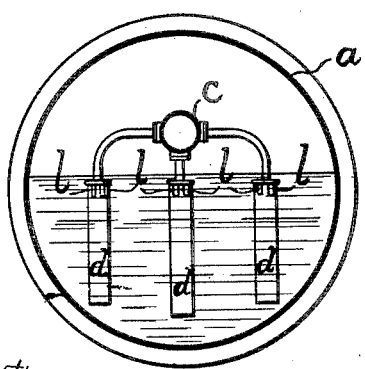
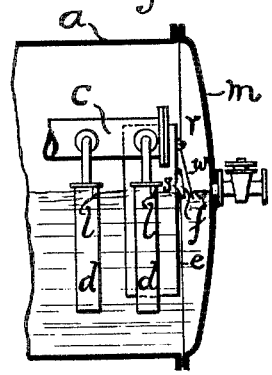

D. B. MORISON.
STEAM REGENERATIVE ACCUMULATOR AND WATER HEATER.
APPLICATION FILED AUG. 23, 1912.
1,081,132.
Patented Dec. 9, 1913.
3 SHEETS—SHEET 2.
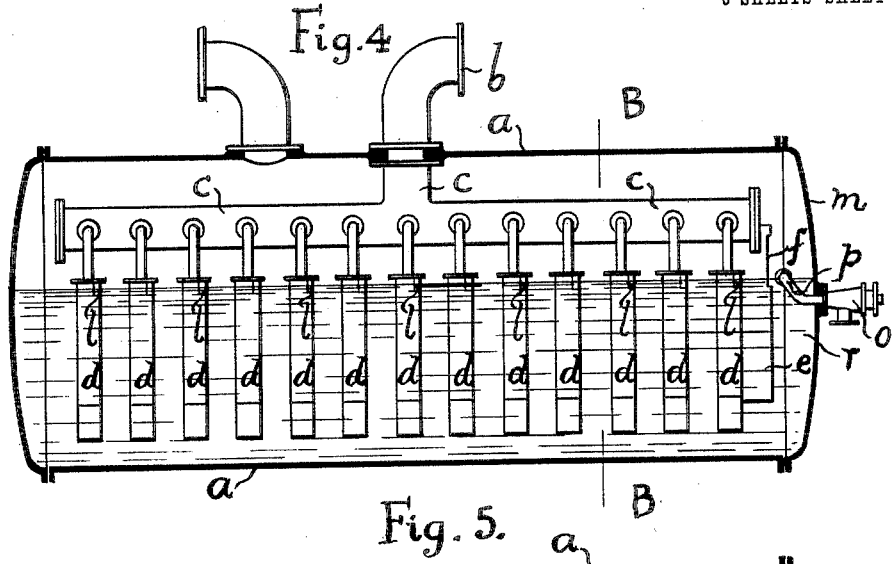
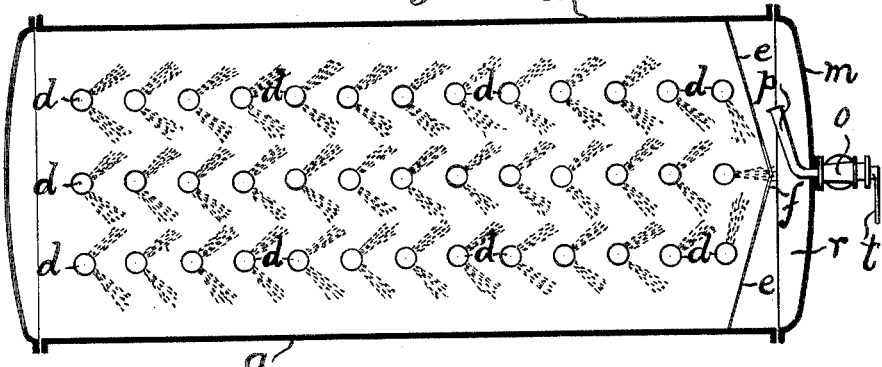
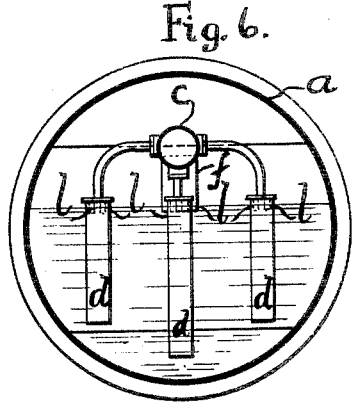
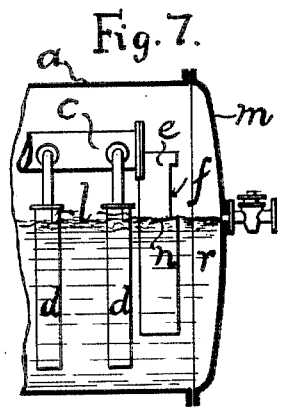
Attest
Edwd L Tolson
C E Parsons
Inventor:
Donald B. Morison
by Spear, Middleton, Donaldson & Spear
Attys.

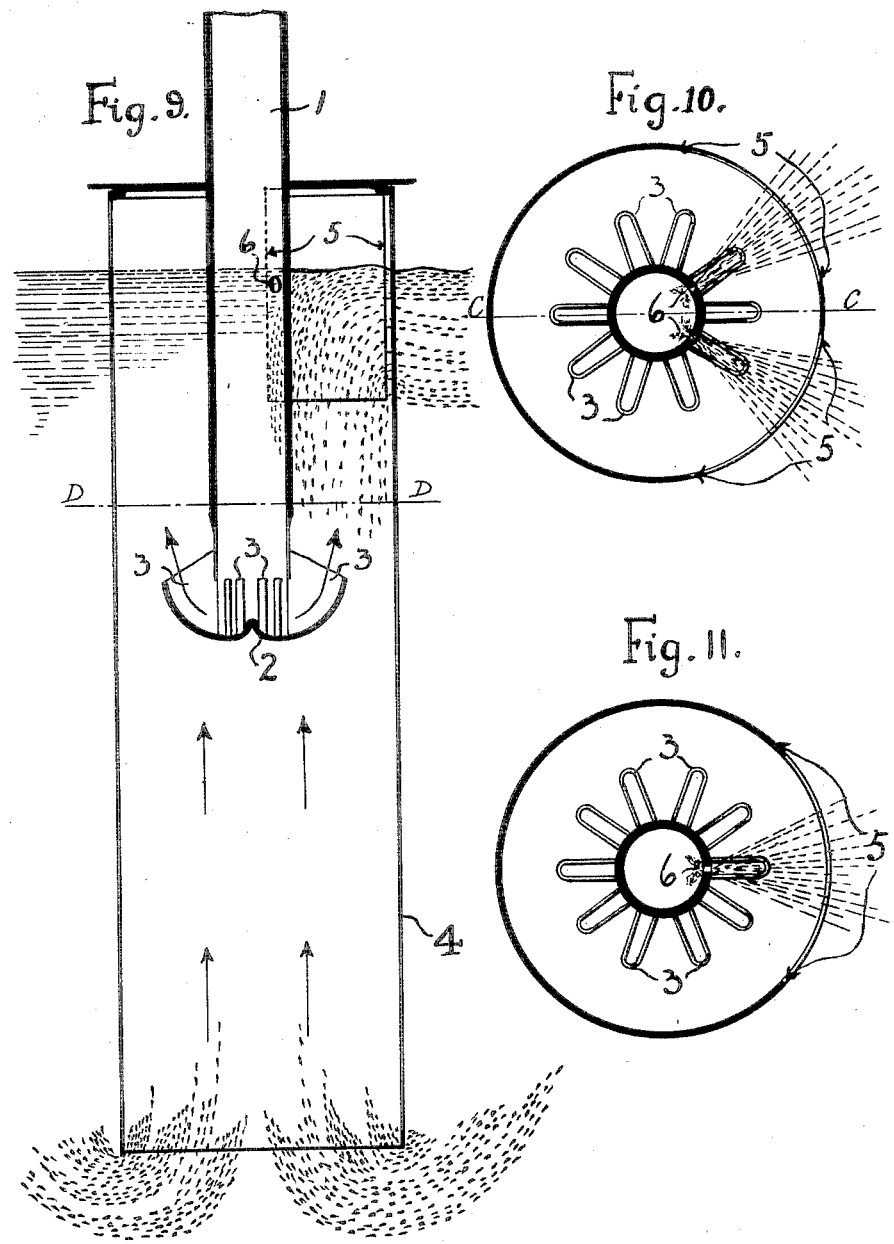

UNITED STATES PATENT OFFICE.

DONALD BARNS MORISON, OF HARTLEPOOL, ENGLAND.

STEAM-REGENERATIVE ACCUMULATOR AND WATER-HEATER.

1,081,132.   Specification of Letters Patent.   Patented Dec. 9, 1913.

Application filed August 23, 1912. Serial No. 716,646.

*To all whom it may concern:*

Be it known that I, DONALD BARNS MORISON, a subject of the King of Great Britain and Ireland, residing at Hartlepool, in the county of Durham, England, have invented Improvements in Steam-Regenerative Accumulators and Water-Heaters, of which the following is a specification.

In the working of steam regenerative accumulators and water heaters, such as feed water heaters, when a film or layer of oil floats on the surface of the water, the efficiency of the apparatus is decreased and it is therefore very advantageous that the oil should be removed.

The object of this invention is apparatus whereby the float oil is concentrated or collected in one or more desired parts of a steam regenerative accumulator or water heater by surface flow, so that it can be readily removed.

In carrying out the invention according to one arrangement, the velocity of the flow which results from the discharge of the steam supplied to the accumulator or water heater through nozzles or the like, is utilized for establishing a surface flow of water in a required direction toward and into a receiver in which the float oil is retained and from which the outflow of water is at a lower level, the retained oil being removed continuously as by a float controlled valve or periodically as by a cock.

In the specification of Letters Patent No. 967,142 of 1910, granted to me, there is described a device in which a steam nozzle is placed within a water circulating tube, the water flow at the discharge from the tube being distributed radially. According to the present invention, with such an arrangement, the discharge from each tube or its equivalent is so arranged that the flow is approximately in one direction, and when large numbers of these circulating tubes are employed the issuing streams are so arranged as to create a surface flow in one direction, the return flow, it may be, at a lower level being in the reverse direction. At the part where it is desired to concentrate the oil, as for example at one end of the vessel forming the accumulator or water heater, there is provided an oil collecting receiver which may be formed by an angle plate so arranged that the surface flow passes through openings between the ends of the plate and the sides of the vessel into a space between the plate and the end of the vessel, or there may be two directing plates and a central opening, or the surface flow may be over a weir formed by an inclined plate. The plate or plates extend upwardly above the normal water level or into the steam space, and downwardly into the water, the return flow of water being between the bottom of the plate and the bottom of the vessel. The oil collecting receiver and the collecting plates may be formed in any other convenient manner in order to facilitate the collection and retention of the oil, and may be placed in one or more parts of the vessel forming the accumulator or water heater although it is preferable that the oil collector should be at one end so as to establish a regular surface flow in one direction from one end of the accumulator or water heater to the other end, which besides concentrating the oil has a favorable effect in causing an increased circulation of water.

The invention may be carried out in various ways and may be applied in connection with liquid containing steam regenerative accumulators and water heaters of any desired type.

The accompanying diagrammatic illustrations, Figures 1, 2 and 3; Figs. 4, 5 and 6; Fig. 7; and Fig. 8 represent applications of the invention to a steam regenerative accumulator or feed water heater in which steam passes into a body of water, and Figs. 9, 10 and 11 represent convenient forms of steam condensing and water circulating devices according to the present invention.

With reference to Figs. 1, 2 and 3, Fig. 1 is a vertical longitudinal section of a steam regenerative accumulator, or it may be a feed water heater, Fig. 2 being a sectional plan view on the water line in Fig. 1, and Fig. 3 a vertical cross section on the line A—A in Fig. 1 looking toward the left hand end of the apparatus. Steam enters the vessel *a* through the pipe *b* and passes through the distributing pipe *c* to the steam condensing and water circulating devices *d* which are so constructed and arranged that the streams of water issuing from the outlets *l* at the top of the circulating tubes *d* are approximately in one direction as indicated in Fig. 2, so as to create a surface flow toward the right hand end of the vessel where the oil and other floating matter carried by the surface flow of water is guided by the angle plate *e*, and the steam discharge nozzles, through the openings *f* into the receiver *r* formed between the plate *e* and the end *m* of the vessel, the receiver *r* being fitted with a scumming device *g* by which the oil and other floating matter collected and concentrated in the receiver may be removed continuously or periodically as required.

Figs. 4, 5 and 6 show another arrangement of the invention, Fig. 4 being a vertical longitudinal section of a steam regenerative accumulator or feed water heater, Fig. 5 a sectional plan view on the water line in Fig. 4, and Fig. 6 a vertical cross section on the line B—B looking toward the right hand end of the vessel. In this example the outlets *l* from the circulating tubes *d* extend above the water level and the receiver *r* is formed by the end *m* and the angle plate *e* which extends from side to side of the vessel and is provided with a central opening *f* through which the oil and other matter floating on the water is carried by the surface flow into the receiver *r* from whence it may be removed by the scumming device *p* which is attached to the plug of the cock *o* so that by turning the handle *t* the pipe *p* may be placed at either side of the receiver.

Fig. 7 is a modification of the arrangement shown in Figs. 4, 5 and 6, and in which, in order to trap the oil in the receiver and prevent a return flow through the opening *f* in the plate *e*, such opening is terminated slightly above the water level and is provided with an inclined plate *n* extending downwardly below the water level so that the surface flow of water is carried, by its velocity produced by the discharge of steam from the devices *d*, over the plate *n* and into the receiver *r*.

Fig. 8 is a further modification of the arrangement illustrated in Figs. 4, 5 and 6, and in which the opening *f* in the plate *e* has a projecting lip *s* that forms with the flap *w* hinged to the plate *e*, a non-return valve, the return flow of oil and other floating matter being prevented by the automatic closing of the valve when the surface flow of water through the opening *f* ceases.

Figs. 9 and 10 illustrate a convenient form of steam condensing and water circulating device for the purpose of causing a uniform flow of water in a desired direction. Fig. 9 is a sectional elevation on the line C—C of Fig. 10, and Fig. 10 is a sectional plan view on the line D—D in Fig. 9. Steam is supplied to the nozzle 2 through the pipe 1 and is discharged upwardly into the surrounding water through the outlets 3, whereby the steam is partly or wholly condensed and an active upward circulation of water produced in the tube 4. The outlets 5 at the top of the tube are formed at one side thereof so that the upwardly circulating water is discharged from the tube in approximately the same direction, for the purpose hereinbefore set forth. In order to further promote the surface flow of water, openings 6 may be provided for the discharge of steam from the central pipe 1 through the water outlets 5, and although the openings 6 are shown below the water level in the arrangement illustrated, they may if so desired, be situated above the water level and discharge a jet of steam on to the surface of the water for the purpose of forcing the oil and other floating matter in the direction desired.

The steam condensing and water circulating device illustrated in Figs. 9 and 10 may, instead of having two outlets for the circulated water, have one only, as shown in sectional plan view in Fig. 11.

Although, by way of example, the steam discharge nozzles described in the specification of my Letters Patent No. 967,142 of 1910 are referred to as a means for creating a surface flow with the object set forth, it is to be understood that the nozzles may be otherwise suitably constructed and that any other suitable means may be employed for creating a surface flow.

What I claim is:—

1. A steam regenerative accumulator having submerged steam condensing and water circulating devices, consisting of circulating tubes, steam discharge outlets disposed within said circulating tubes for directing a surface flow of water toward one end of the accumulator, water outlets in said circulating tubes arranged at one side thereof adapted to coöperate with said discharge outlets for establishing a surface flow in one direction, substantially as described.

2. A steam regenerative accumulator having submerged steam condensing and water circulating devices consisting of vertical circulating tubes open at the bottom and having an outlet near the surface of the water disposed at one side of the tubes, steam pipes extending centrally into said circulating tubes and provided at their lower ends with steam discharge nozzles having outlets formed at one side adapted to coöperate with the water outlets of said circulating tubes for establishing a surface flow directed toward one end of the accumulator, an oil receiving chamber provided at the end of the accumulator to which the surface flow is directed, substantially as described.

3. A steam regenerative accumulator having submerged condensing and water circulating devices consisting of vertical circulating tubes open at the bottom and having an outlet near the surface of the water disposed at one side of the tube, steam pipes extending into said circulating tubes and arranged concentrically therewith, provided at their lower ends with steam discharge nozzles, said nozzles having outlets formed at one side thereof adapted to coöperate with the water outlets of said circulating tubes for establishing a surface flow directed toward one end of the accumulator, other outlets in said steam pipes formed near the water surface and on the side in line with the water outlet of the circulating tubes, an oil receiving chamber provided at the end of the accumulator to which the surface flow is directed and means within said chamber for collecting and concentrating said oil, substantially as described.

4. A steam regenerative accumulator having submerged steam condensing and water circulating devices, consisting of vertical circulating tubes, steam discharge nozzles disposed within said tubes, steam discharge openings in said nozzles and water outlets in said circulating tubes coöperating with each other for directing a surface flow toward one end of said accumulator, an oil receiving chamber located at the end to which the surface flow is directed, said chamber provided with a non-return valve automatically closed when the surface flow ceases, and means within said chamber for collecting and concentrating the oil, substantially as described.

Signed at West Hartlepool, in the county of Durham, England, this sixth day of August 1912.

DONALD BARNS MORISON.

Witnesses:
HARRY FOTHERGILL,
HAROLD SMITH.